(12) United States Patent
Kojima et al.

(10) Patent No.: US 6,184,766 B1
(45) Date of Patent: Feb. 6, 2001

(54) SOLENOID VALVE

(75) Inventors: Takao Kojima; Hidekazu Himei, both of Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/462,872

(22) PCT Filed: Aug. 25, 1997

(86) PCT No.: PCT/JP97/02945

§ 371 Date: Jan. 18, 2000

§ 102(e) Date: Jan. 18, 2000

(87) PCT Pub. No.: WO99/10671

PCT Pub. Date: Mar. 4, 1999

(51) Int. Cl.[7] .................................................. A01F 3/00
(52) U.S. Cl. ...................... 335/255; 335/251; 251/129.14
(58) Field of Search .................................. 335/250, 251, 335/255–257, 261, 262; 251/129.09, 129.14, 129.15, 129.17, 129.21, 129.22; 123/499

(56) References Cited

U.S. PATENT DOCUMENTS

| 5,597,013 | * | 1/1997 | Ushakov ........................ 251/129.01 |
| 5,651,391 | * | 7/1997 | Connolly et al. ............... 137/625.65 |
| 5,752,689 | * | 5/1998 | Barkhimer et al. ............. 251/129.15 |
| 5,915,416 | | 6/1999 | Okazaki et al. ................ 137/596.17 |
| 5,950,984 | * | 9/1999 | Anderson et al. .............. 251/129.14 |

FOREIGN PATENT DOCUMENTS

| 61-278675 | * | 12/1986 | (JP) . |
| 8-105563  | * | 4/1996  | (JP) . |
| 8-226566  | * | 9/1996  | (JP) . |
| 9-79412   | * | 3/1997  | (JP) . |

* cited by examiner

Primary Examiner—Lincoln Donovan
Assistant Examiner—Tuyen T. Nguyen
(74) Attorney, Agent, or Firm—Sughrue, Mion, Zinn, Macpeak & Seas, PLLC

(57) ABSTRACT

A solenoid valve is composed of a bobbin wound with a coil, and a housing separated from the bobbin and having an input port, an output port and a discharge port. The bobbin incorporating the plunger and the housing incorporating the ball for switching over the channel and the valve rod are arranged via a plate in opposite positions, and are integrally formed by caulking claws of a case covering the bobbin into the housing and the plate. An engaged section is formed on an end face on the housing side of the bobbin, an engaged section is formed on an end face on the bobbin side of the housing, and engaging sections for bobbin positioning and housing positioning are formed on the plate. A relative relationship between the bobbin and the housing is maintained by engaging these engaging sections with the engaged sections of the bobbin and the housing.

4 Claims, 5 Drawing Sheets

SOLENOID VALVE

RELATED APPLICATIONS

This application is the U.S. national phase of PCT application PCT/JP97/02945 filed on Aug. 25, 1997.

TECHNICAL FIELD

The present invention relates to a solenoid valve, and more particularly, to a solenoid valve which makes it possible to switch over the channel by driving by an electromagnetic unit in response to an electric signal.

BACKGROUND ART

FIG. 7 is a sectional view illustrating an non-energizing state of a conventional normally closed type three-way solenoid valve.

In FIG. 7, a bobbin 1 is a formed resin inserted with a plate 22 made of a magnetic material, and terminals 6 and 7, provided with a coil winding section 1g. Further, the bobbin 1 is provided with an input port 2, an output port 3 and a discharge port 4, and has O-ring grooves 1a and 1b receiving O-rings 9 and 10 for preventing oil leakage.

A plunger 29 is made of a magnetic material, guided by the bobbin 1 and vertically slidably arranged. A bush 23 is made of a magnetic material, and inserted on one end side of the bobbin 1 so as not to be in contact with the plunger 29. Further, a case 11 is made of a magnetic material, attached to the outer periphery of the bobbin 1 having a coil 12 wound on the coil winding section 1g, and is secured to the plate 22 by caulking. A holder 24 made of a magnetic material is provided between the case 11 and the bush 23, and ensures magnetic association of the two. A non-magnetic holder 25 is attached to the one end side of the bobbin 1 so as to secure internal parts of the solenoid.

A ball 13 is inserted into the input port 2 at the other end of the bobbin 1, and further a bush 14 is inserted therein. Going off of the ball 13 is prevented by heat-caulking a caulking section 1c of the bobbin. The plunger 29 is provided integrally with a valve rod 29a for pushing the ball 13 attached to the input port 2, and the base portion of the valve rod 29a forms a valve section 29b.

A magnetic circuit is formed with the case 11, the plate 22, the plunger 29, the bush 23 and the holder 24.

In the conventional solenoid valve 100 having the configuration described above, in a non-energizing state of the coil 12, the ball 13 is seated onto a valve seat 1e under a pressure of a fluid acting on the input port 2, and the fluid does not flow in from the input port 12. Movement of the ball 13 seated onto the valve seat 1e pushes up the valve rod 29a. As a result of upward movement of this valve rod 29a, i.e., the plunger 29, the valve section 29b leaves a valve seat 1d, and communication is established between the output port 3 and the discharge port 4.

When energizing the coil 12, magnetism is supplied to the magnetic circuit composed of the case 11, the plate 22, the plunger 29, the bush 23 and the holder 24, and the plunger 29 is magnetically attracted toward the plate 22. This magnetic attraction overcomes the pressure of the fluid acting via the ball 13 and the plunger 29, and the plunger 29 moves toward the plate 22. Under the effect of this movement of the plunger 29, the valve section 29b is seated onto the valve seat 1d, and at the same time, the valve rod 29a of the plunger 29 pushes the ball 13. The ball 13 thus leaves the valve seat 1e. The output port 3 is thus separated from the discharge port 4, and there is achieved communication between the input port 2 and the output port 3.

In the conventional solenoid valve 100, a portion generating an electromagnetic force and a valve portion controlling the fluid are integrally configured. It is therefore impossible to achieve common parts among solenoid valves of different specifications, leading to a higher cost.

DISCLOSURE OF THE INVENTION

The present invention was developed to solve the foregoing problems and has an object to provide a solenoid valve having a configuration in which the portion generating an electromagnetic force can be separated from the valve portion controlling the fluid, which permits improvement of general-purpose property of parts and achievement of a lower cost.

The invention provides a solenoid valve having an input port, an output port and a discharge port, in which a channel is switched over by driving by an electromagnetic unit, comprising a cylindrical bobbin having a center hole pierced therein and a coil wound on the outer periphery thereof; a housing having the input port, the output port and the discharge port, arranged on one end side of the bobbin; a plate made of a magnetic material, provided between the bobbin and the housing; a case, made of a magnetic material, having a bottom plate provided with a throughhole and a plurality of claws extending from ends of the bottom plate in a direction at right angles to the main surface of the bottom plate, covering the bobbin from the other end of the bobbin so as to align the center of the throughhole with the center hole of the bobbin, and integrally securing the bobbin, the plate and the housing by caulking the claws with the plate and housing; a plunger, made of a magnetic material, having a cylindrical shape with a bottom, inserted into the center hole of the bobbin with the bottom directed toward the plate, which is reciprocally arranged in the axial direction of the bobbin as the outer peripheral surface on the opening side of the plunger faces on the inner wall surface of the throughhole of the case, and is magnetically attracted toward the plate by a magnetic attracting force produced during energizing of the coil; a ball, arranged in the housing, for switching over the channel by the utilization of a difference between the magnetic attracting force and pressure of a fluid acting via the input port; and a valve rod made of a non-magnetic material, arranged in the housing, for transmitting the magnetic attracting force to the ball under pressing by the plunger magnetically attracted toward the plate; wherein an engaged section is formed on an end face on the housing side of the bobbin, an engaged section is formed on an end face of the bobbin side of the housing, an engaging section for positioning the bobbin and an engaging section for positioning the housing are formed on the plate, and a relative relationship between the bobbin and the housing is maintained by engaging these engaging sections with the engaged sections of the bobbin and the housing.

BEST MODE FOR CARRYING OUT THE INVENTION

Now, a few preferred embodiments of the invention will be described below with reference to the drawings.

Embodiment 1

Figure 1:
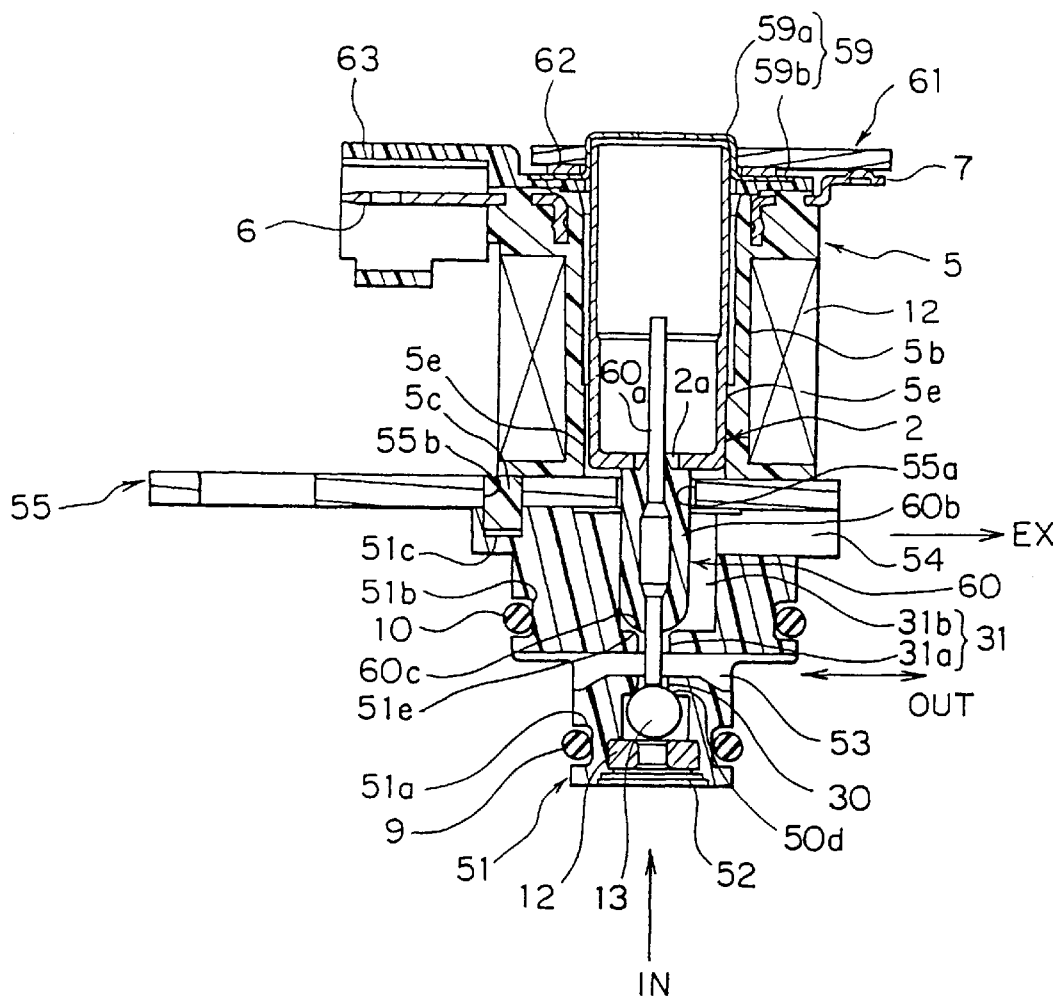
FIG. 1 is a sectional view illustrating a non-energizing state in a normally closed type three-way solenoid valve of a first embodiment of the present invention.
Figure 2:
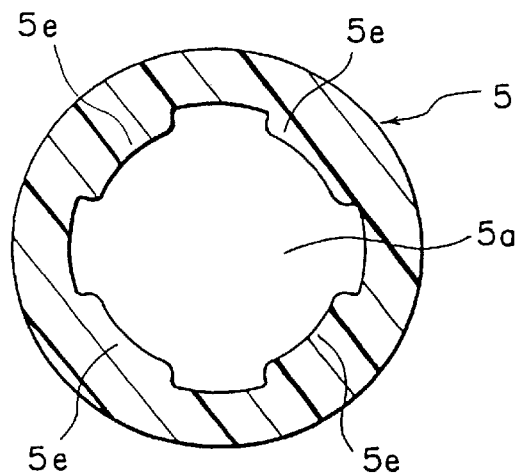
FIG. 2 is a sectional view illustrating a bobbin used in the normally closed type three-way solenoid valve of the first embodiment of the invention.
Figure 3:
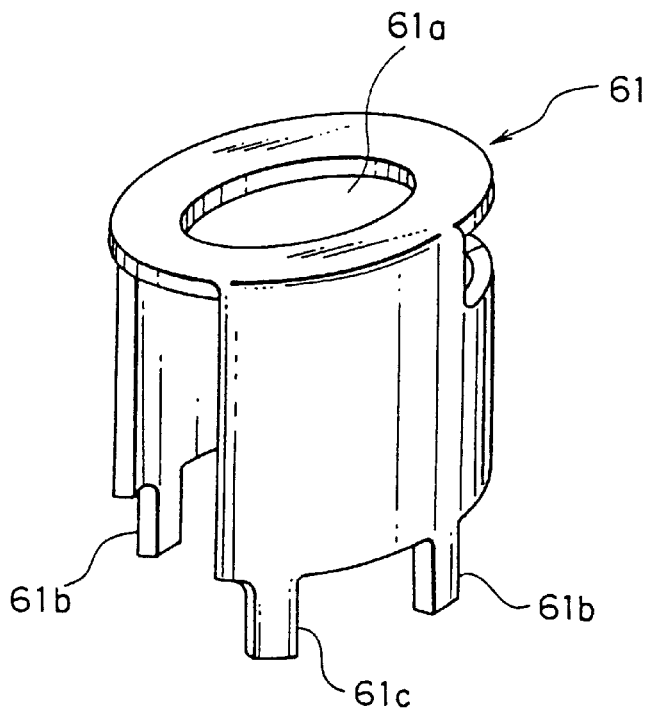
FIG. 3 is a perspective view illustrating a case used in the normally closed type three-way solenoid valve of the first embodiment of the invention.

FIG. 1 is a sectional view illustrating a non-energizing state in a normally closed type three-way solenoid valve of a first embodiment of the invention; FIG. 2 is a sectional view illustrating a bobbin used in the normally closed type three-way solenoid valve of the first embodiment of the invention; and FIG. 3 is a perspective view illustrating a case used in the normally closed type three-way solenoid valve of the first embodiment of the invention.

In FIG. 1, a housing 51 is a formed resin having an input port 52, an output port 53 and a discharge port 54, and provided with O-ring grooves 51a and 51b for attachment of O-rings 9 and 10 on the outer periphery thereof, and further, with a positioning engagement hole 51c. The housing 51 is provided with a channel 30 for communication between the input port 52 and the output port 53, and a first valve seat 51d is provided on the input port 52 side of the channel 30. Another channel 31 for communication between the output port 53 and the discharge port 54 is provided in the housing 51. The channel 31 is composed of a small-diameter channel 31a for insertion of a valve rod described later and a large-diameter channel 31b for insertion of a resin member of the valve rod. A second valve seat 51e is provided on the discharge port 54 side of the channel 31a. To ensure easy flow of the fluid, the channel 31b is formed with a diameter larger than the outside diameter of the resin member of the valve rod, and a plurality of guides for guiding the resin member are provided on the inner peripheral wall surface in the circumferential direction. The channels 30 and 31 having the first and second valve seats 51d and 51e are provided coaxially. A ball 13 is inserted into the input port 52 of the housing 51, and further a bush 12 is inserted therein. Falling off of the ball 13 is prevented by heat-caulking the housing 51.

The bobbin 5 is a cylindrically formed resin into which terminals 6 and 7 are insert-molded. A coil winding section 5b is provided on the outer periphery of the bobbin 5, and a positioning projection 5c is provided on an end face on one side. Four guide sections 5e for guiding the plunger are provided in the circumferential direction, as shown in FIG. 2, on the inner peripheral surface on one side of the center hole 5a of the bobbin 5. A cover 63 made of a resin is attached to the bobbin 5 so as to cover the projection of the terminal 6. The coil 12 is wound on the coil winding section 5b, and the both ends are electrically connected to the terminals 6 and 7, respectively.

The plunger 2 is made of a magnetic material formed into a cylindrical shape with a bottom, and has a throughhole 2a pierced at the center of the bottom. The plunger 2 is arranged in the center hole 5a of the bobbin 5 and is vertically slidable with the outer periphery on the bottom side guided by the guide sections 5e.

A case 61 is made of a magnetic material formed into a cylinder with a bottom, part of the side walls of which is partially notched. As shown in FIG. 3, a throughhole 61a is pierced at the center of the bottom of the case 61, and securing claws 61b and 61c are provided two by two on the opening side thereof. A cap 59 is made of a non-magnetic material and has a guide section 59a having an inside diameter slightly larger than the outside diameter of the plunger 2 and a flange section 59b extending to the outer periphery of the guide section 59a. The cap 59 is attached to the case 61 by inserting the guide section 59a into the throughhole 61a of the case 61 from inside.

A valve rod 60 is a formed resin into which a metal rod 60a is insert-molded, in which the both ends of a rod 60a project from a resin member 60b, and one end side of the resin member 60b is in close contact with a second valve seat 51e to form an outside diameter shape and constitutes a valve section 60c. A plate 55 is made of a magnetic material and has a throughhole 55a for insertion of the valve rod 60 and a throughhole 55b for insertion of the projection 5c of the bobbin 5.

For assembly of the solenoid valve 20 having the foregoing configuration, the plate 55 is assembled from above into the housing 51 incorporating the ball 13. At this point, the throughhole 55a of the plate 55 is aligned with the channel 31 of the housing 51 having the second valve seat 51e, and the throughhole 55b of the plate 55 is aligned with the engagement hole 51c of the housing 51. The valve rod 60 is inserted from the throughhole 55a into the channel 31. The resin member 60b of the valve rod 60 is housed in the channel 31b, and the rod 60a projecting from a side of the resin member 60b is inserted into the channels 31a and 30.

Then, the bobbin 5 incorporating the terminals 6 and 7, the coil 12 and the plunger 2 is assembled from above into the housing 51. At this point, the projection 5c of the bobbin 5 is inserted into the throughhole 55b of the plate 55, engaged with the engagement hole 51c of the housing 51, and the bobbin 5, the plate 55 and the housing 51 are positioned in a lump. The rod 60a extending from the other side of the resin member 60b of the valve rod 60 is inserted through the throughhole 2a and extends into the interior of the plunger 2.

A wave washer 62 is arranged on the upper portion of the bobbin 5, and the case 61 is placed on the bobbin 5 from above to cover the same. At this point, the opening side of the plunger 2 is housed in the guide section 59a of the cap 59. Then, the claws 61b are caulked into the housing 51 while pressing down the case 61. The claws 61c are caulked into the plate 55, to integrally form the housing 51, the plate 55 and the bobbin 5. Then, an end of the terminal 7 is welded together with the case 61 to complete assembly of the solenoid valve 20.

In the thus assembled solenoid valve 20, a magnetic circuit is formed with the case 61, the plate 55 and the plunger 2, and the both ends of the plunger 2 are guided by the guide section 5e of the bobbin 5 and the guide section 59a of the cap 59.

Figure 4:
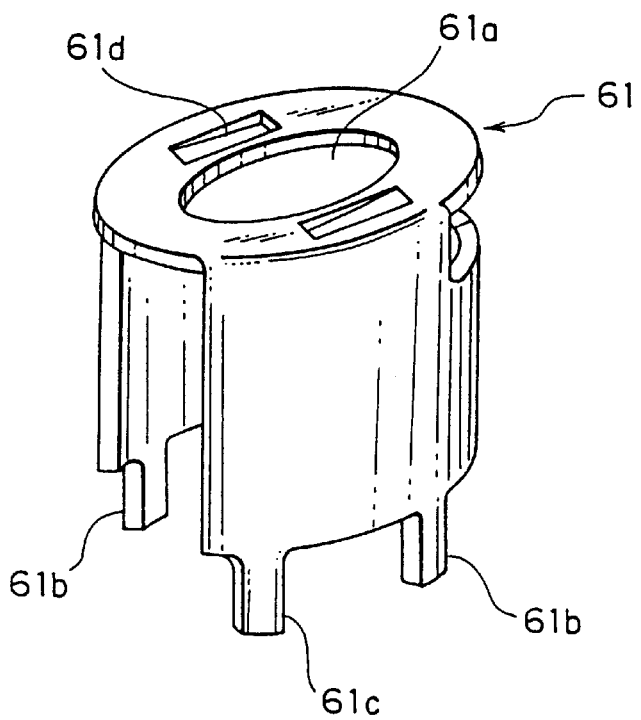
FIG. 4 is a perspective view illustrating another case used in the normally closed type three-way solenoid valve of the first embodiment of the invention.

A wave washer 62 is provided between the bottom of the case 61 and the upper end of the bobbin 5 to maintain a pressing load under the effect of reaction force resulting from elastic deformation of the wave washer 62. As shown in FIG. 4, a pressing load may be maintained by a pressing piece 61d provided on the bottom of the case 61.

Now, operations of the solenoid valve 20 will be described below.

In the non-energizing state of the coil 12, the ball 13 is seated onto the first valve seat 51d under the effect of the pressure of the fluid acting on the input port 52, thus preventing the fluid from flowing in from the input port 12.

The rod 60a is pushed up by the movement of the ball 13 seated on the first valve seat 51d. Under the effect of this upward movement of the rod 60a, i.e., the resin member 60b, the valve section 60c leaves the second valve seat 51e, and communication is established between the output port 53 and the discharge port 54.

When the coil 12 is fed with current, magnetism flows into the magnetic circuit composed of the case 61, the plate 55 and the plunger 2, and the plunger 2 is magnetically attracted toward the plate 55. This magnetic attracting force overcomes the pressure of the fluid acting via the ball 13, the valve rod 60 and the plunger 2, and the plunger 2 moves toward the plate 55. As a result of this movement of the plunger 2, the valve section 60c is seated onto the second valve seat 51e, and at the same time, the rod 60a of the valve rod 60 pushes the ball 13 which leaves the first valve seat 51d. The output port 53 is thus separated from the discharge port 54, and communication is achieved between the input port 52 and the output port 53.

According to this first embodiment, as described above, since the solenoid valve 20 is divided into a bobbin side (generating electromagnetic force) and a housing side (valve section for controlling the fluid), it is possible to use parts common to various solenoid valves of different types, and to reduce cost.

The bobbin 5 and the housing 51 are integrally formed through caulking of the claws 61b and 61b of the case 61, an improved assembly convenience is available.

The plate 55 is provided between the bobbin 5 and the housing 51, and the projection 5c provided in the bobbin 5 is engaged with the engagement hole 51c of the housing 51 via the throughhole 55b of the plate 55. It is therefore possible to easily position the bobbin 5, the housing 51 and the plate 55, thus further improving assembly convenience. A certain relative relationship is maintained between the bobbin 5 and the housing 51. The plunger 2 and the channels 30 and 31 can therefore be coaxially arranged without fail, permitting smooth vertical movement of the plunger 2 and the valve rod 60, and there is thus available stable valve opening/closing operations.

The guide sections 5e are provided in the center hole 5a of the bobbin 5, and the guide section 59a is provided on the cap 59 attached to the throughhole 61a on the bottom of the case 61 so that the both ends of the plunger 2 are guided by the guide sections 5e and 59a. This allows smooth up/down movement of the plunger 2, thus ensuring stable valve opening/closing operations.

The valve rod 60 is formed by causing the both ends of the metal rod 60a to project and insert-molding the same into the resin member 60b. Only the impact portion with the ball 13 is formed with the rod 60a to eliminate wear and damage resulting from collision with the ball 13 and reduce the weight while keeping a satisfactory durability. Further, when the entire valve rod is made of a metal, it is difficult to form the valve section 60c from the point of view of workability. Upon insert-molding, however, the configuration of the present embodiment permits integral forming of the valve section 60c with the resin member 60b, thus enabling formation of the valve rod 60 having the valve section 60c at a low cost.

In the foregoing first embodiment, the projection 5c is provided in the bobbin 5, the throughhole 55b is provided in the plate 55, and the engagement hole 51c is provided in the housing 51 so as to engage the projection 5c into the engagement hole 51c via the throughhole 55b for positioning the bobbin 5, the plate 55 and the housing 51. However, the positioning mechanism is not limited to this, but positioning of the bobbin 5, the plate 55 and the housing 51 may be accomplished by providing projections on the bobbin 5 and the housing 51, providing a bobbin positioning throughhole and a housing positioning throughhole in the plate, and engaging the projections of the bobbin and the housing into the bobbin positioning throughhole and the housing positioning throughhole of the plate. Another alternative of positioning the bobbin 5, the plate 55 and the housing 51 comprises providing engagement holes in the bobbin 5 and housing 51, providing a bobbin positioning projection and a housing positioning projection on the plate, and engaging the bobbin positioning projection and the housing positioning projection of the plate into the engagement hole of the bobbin and the housing, respectively. Further another alternative comprises providing a projection on the bobbin 5, providing an engagement hole in the housing 51, providing a bobbin positioning throughhole and a housing positioning projection in the plate, engaging the projection on the bobbin into the bobbin positioning throughhole of the plate, and engaging the housing positioning projection on the plate into the engagement hole of the housing.

Embodiment 2

Figure 5:
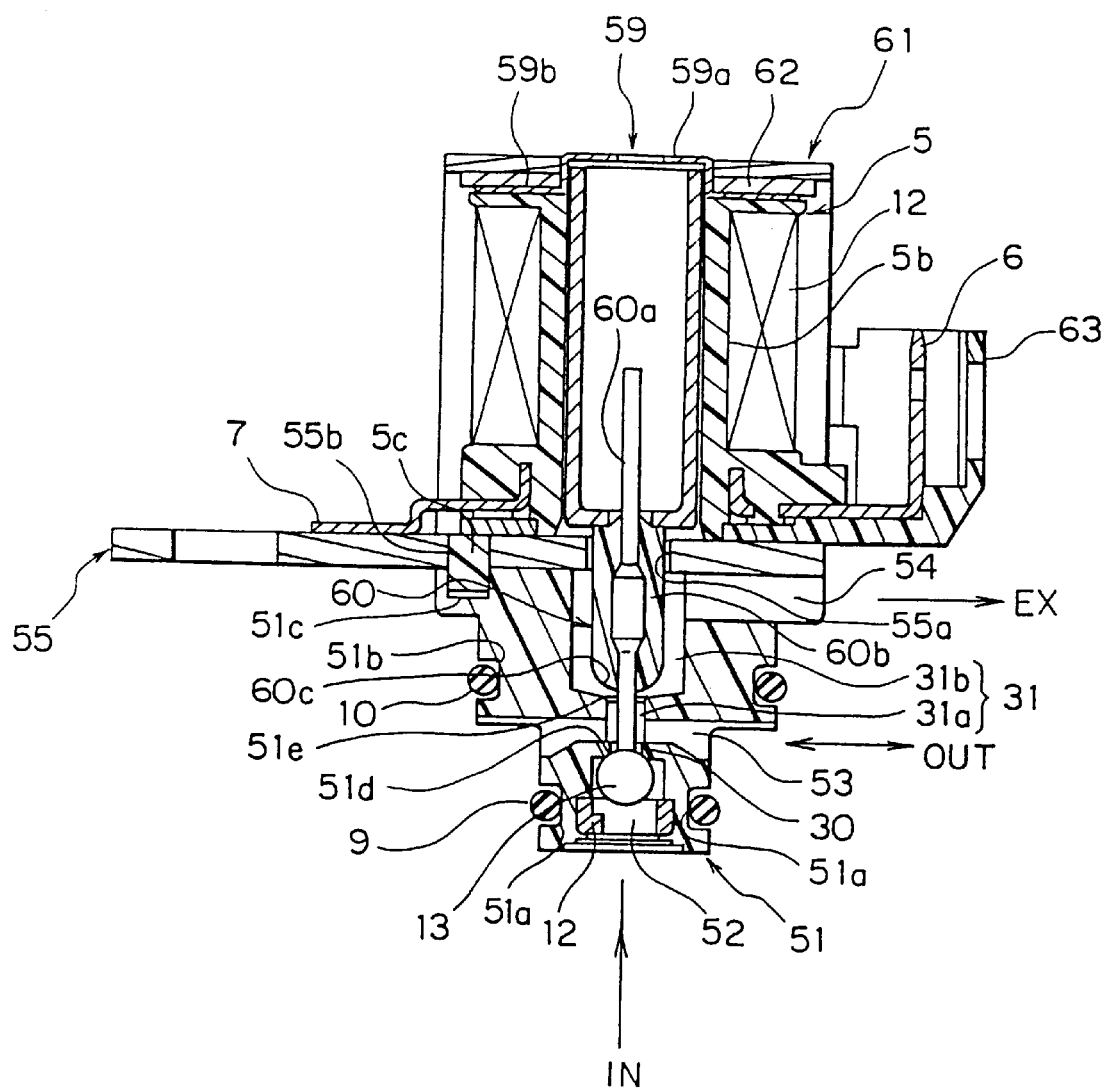
FIG. 5 is a sectional view illustrating a non-energizing state in a normally closed type three-way solenoid valve of a second embodiment of the invention.

FIG. 5 is a sectional view illustrating a non-energizing state in a normally closed type three-way solenoid valve of a second embodiment of the invention.

In FIG. 5, a bobbin 5 is formed by insert-molding terminals 6 and 7 so as to be located at the lower end. The terminal 6 is folded and extends upward from a side of the bobbin 5. A cover 63 made of a resin is attached to the bobbin 5 so as to cover the projecting portion of the terminal 6, and the terminal 7 is welded together with the plate 55. The other portions of configuration are the same as in the foregoing first embodiment.

In the second embodiment as well, therefore, the same effects as in the foregoing first embodiment are available.

According to the second embodiment, in which the terminal 6 projects from the lower side upward, the terminal 6 can be drawn out upward, thus providing a merit of a higher freedom of installation.

As a result of the configuration in which the solenoid valve is divided into the bobbin side (generating electromagnetic force) and the housing side (valve section for controlling the fluid), it is possible to change the drawing direction of the terminal 6 without largely changing the component parts.

Embodiment 3

Figure 6:
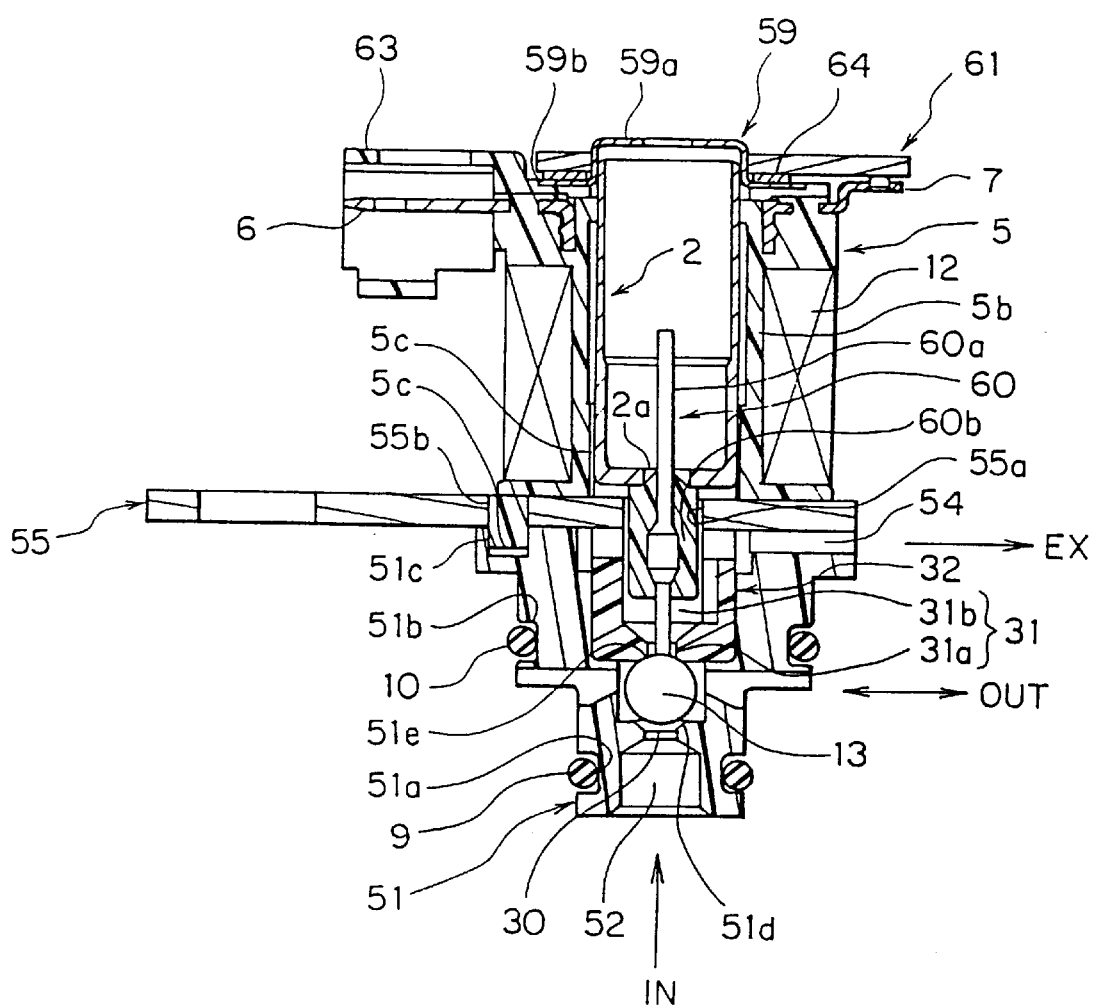
FIG. 6 is a sectional view illustrating a non-energizing state in a normally open type three-way solenoid valve of a third embodiment of the invention.
Figure 7:
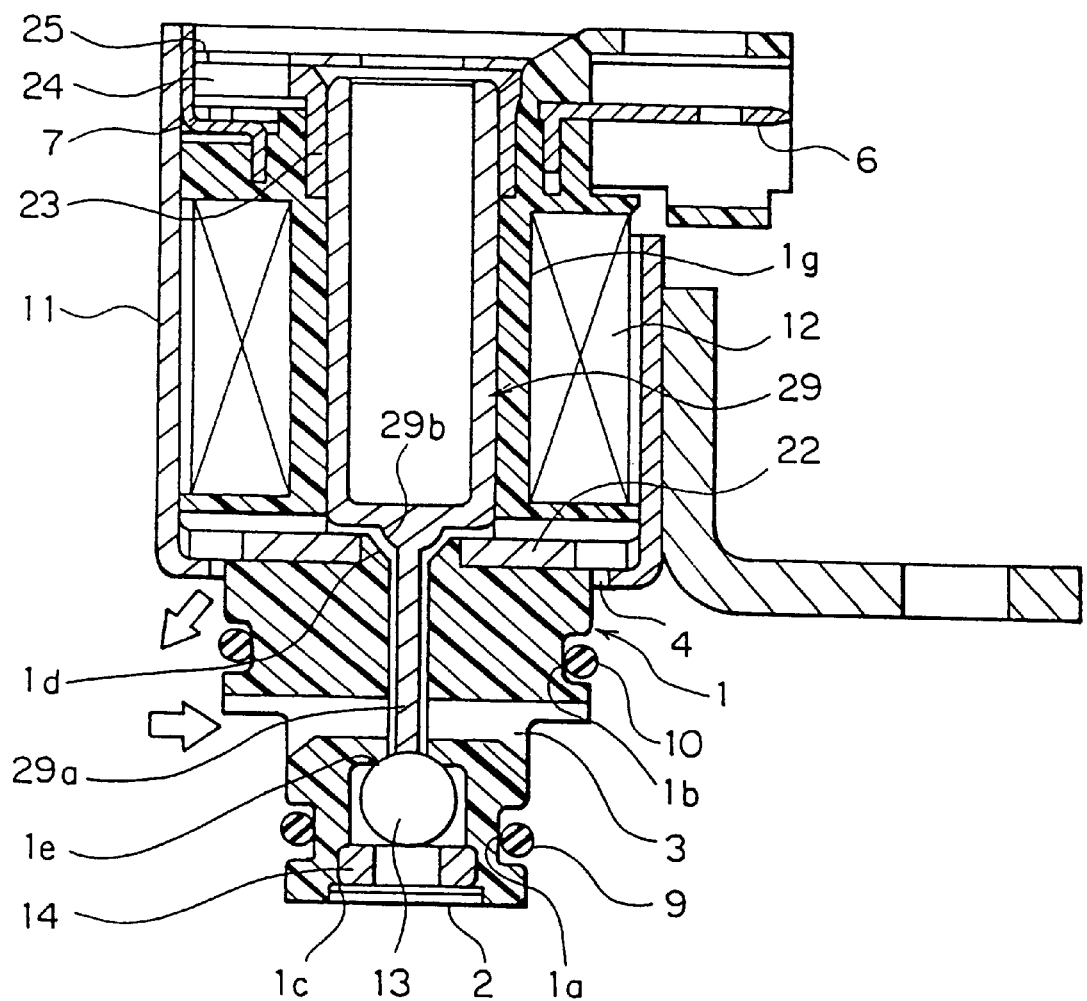
FIG. 7 is a sectional view illustrating a non-energizing state in a conventional normally closed type three-way solenoid valve.

FIG. 6 is a sectional view illustrating a non-energizing state in a normally open type three-way solenoid valve of a third embodiment of the invention.

In FIG. 6, the housing 51 is provided with a channel 30 for providing communication between the input port 52 and the output port 53, and the first valve seat 51d is provided on the input port 52 side of the channel 30. In the housing 51, furthermore, there is provided a valve seat body 32 having a channel 31 for providing communication between the output port 53 and the discharge port 54. The channel 31 is composed of a small-diameter channel 31a for insertion of the rod 60a of the valve rod 60 and a large-diameter channel 31b for insertion of the resin member 60b of the valve rod 60. The second valve seat 51e is provided on the output port 53 side of the channel 31a. Further, the channel 31b is formed with a diameter larger than the outside diameter of the resin member 60b of the valve rod 60 to ensure easy flow of the fluid, and a plurality of guides for guiding the resin member 60b are provided in the circumferential direction on the inner wall surface. In this configuration, the channels 30 and 31 provided with the first and the second valve seats 51d and 51e are coaxially provided. The other portions are the same as in the foregoing first embodiment.

Now, operations of this solenoid valve 21 will be described below.

In the non-energizing state of the coil 12, the ball 13 is seated onto the second valve seat 51e under the effect of the pressure of the fluid acting on the input port 52. There is established communication between the input port 52 and the output port 53, and the output port 53 and the discharge port 54 are disconnected. As a result of movement of the ball 13 being seated onto the second valve seat 51e, the rod 60a is pushed up. Upward movement of the rod 60a, i.e., of the resin member 60b causes the plunger 2 to be guided by the guide sections 5e and 59a to move upward.

When the coil 12 is energized, magnetism flows into the magnetic circuit composed of the case 61, the plate 55 and the plunger 2, and the plunger 2 is magnetically attracted toward the plate 55. This magnetic attracting force overcomes the pressure of the fluid acting via the ball 13, the valve rod 60 and the plunger 2, and the plunger 2 moves toward the plate 55. As a result of this movement of the plunger 2, the rod 60a of the valve rod 60 pushes the ball 13, and the ball 13 leaving the second valve seat 51e is seated onto the first valve seat 51d. This shuts off the input port 52 and the output port 53, and there is provided communication between the output port 53 and the discharge port 54.

In this third embodiment as well, the same effects as in the foregoing first embodiment are available.

The present invention provides, as described above, a solenoid valve having an input port, an output port and a discharge port, in which a channel is switched over by driving by an electromagnetic unit, comprising a cylindrical bobbin having a center hole pierced therein and a coil wound on the outer periphery thereof; a housing having the input port, the output port and the discharge port, arranged on one end side of the bobbin; a plate made of a magnetic material, provided between the bobbin and the housing; a case, made of a magnetic material, having a bottom plate provided with a throughhole and a plurality of claws extending from ends of the bottom plate in a direction at right angles to the main surface of the bottom plate, covering the bobbin from the other end of the bobbin so as to align the center of the throughhole with the center hole of the bobbin, and integrally securing the bobbin, the plate and the housing by caulking the claws with the plate and the housing; a plunger, made of a magnetic material, having a cylindrical shape with a bottom, inserted into the center hole of the bobbin with the bottom directed toward the plate, which is reciprocally arranged in the axial direction of the bobbin as the outer peripheral surface on the opening side of the plunger faces on the inner wall surface of the throughhole of the case, and is magnetically attracted toward the plate by a magnetic attracting force produced during energizing of the coil; a ball, arranged in the housing, for switching over the channel by the utilization of a difference between the magnetic attracting force and pressure of a fluid acting via the input port; and a valve rod made of a non-magnetic material, arranged in the housing, for transmitting the magnetic attracting force to the ball under pressing by the plunger magnetically attracted toward the plate; wherein an engaged section is formed on an end face on the housing side of the bobbin, an engaged section is formed on an end face of the bobbin side of the housing, an engaging section for positioning the bobbin and an engaging section for positioning the housing are formed on the plate, and a relative relationship between the bobbin and the housing is maintained by engaging these engaging sections with the engaged sections of the bobbin and the housing. There is therefore available a solenoid valve in which separation into the bobbin side and the housing side causes no decrease in assembly convenience, improving general-purpose property of parts, which permits achievement of a lower cost.

The foregoing valve rod comprises a resin member and a metal rod insert-molded into the resin member so as to project the both ends thereof from the resin member. It is therefore possible to reduce the equipment weight while keeping durability of the valve rod.

The cap made of a non-magnetic material is provided in the throughhole of the case so as to cover an end on the opening side of the plunger. Magnetic resistance between the opening side of the plunger and the case increases, the it is possible to magnetically attract the plunger toward the plate without fail.

The guide section for guiding the plunger is provided on an inner wall surface on one end side of the center hole of the bobbin, and the both sides of the plunger are guided by the guide section and the cap, respectively. Play of the plunger axial center in reciprocation is thus inhibited, ensuring smooth reciprocation of the plunger, and there are available stable opening/closing operation of the valve.

What is claimed is:

1. A solenoid valve having an input port, an output port and a discharge port, in which a channel is switched over by driving by an electromagnetic unit, comprising:

a cylindrical bobbin having a center hole pierced therein and a coil wound on the outer periphery thereof;

a housing having said input port, said output port and said discharge port, arranged on one end side of said bobbin;

a plate made of a magnetic material, provided between said bobbin and said housing;

a case, made of a magnetic material, having a bottom plate provided with a throughhole and a plurality of claws extending from ends of the bottom plate in a direction at right angles to the main surface of said bottom plate, covering said bobbin from the other end of said bobbin so as to align the center of said throughhole with the center hole of said bobbin, and integrally securing said bobbin, said plate and said housing by caulking said claws with said plate and said housing;

a plunger, made of a magnetic material, having a cylindrical shape with a bottom, inserted into the center hole of said bobbin with the bottom directed toward said plate, which is reciprocally arranged in the axial direction of said bobbin as the outer peripheral surface on the opening side of said plunger faces on the inner wall surface of the throughhole of said case, and is magnetically attracted toward said plate by a magnetic attracting force produced during energizing of said coil;

a ball, arranged in said housing, for switching over the channel by the utilization of a difference between said magnetic attracting force and pressure of a fluid acting via said input port; and a valve rod made of a non-magnetic material, arranged in said housing, for transmitting said magnetic attracting force to said ball under pressing by said plunger magnetically attracted toward said plate;

wherein an engaged section is formed on an end face on the housing side of said bobbin, an engaged section is formed on an end face of the bobbin side of said housing, an engaging section for positioning the bobbin and an engaging section for positioning the housing are formed on said plate, and a relative relationship between said bobbin and said housing is maintained by engaging these engaging sections with the engaged sections of said bobbin and said housing.

2. The solenoid valve according to claim 1, wherein said valve rod comprises a resin member and a metal rod insert-molded into said resin member so as to project the both ends of said metal rod from said resin member.

3. The solenoid valve according to claim 1, further comprising a cap made of a non-magnetic material which is provided in the throughhole of said case so as to cover an end on the opening side of said plunger.

4. The solenoid valve according to claim 3, further comprising a guide section for guiding said plunger which is provided on an inner wall surface on one end side of the center hole of said bobbin, wherein the both sides of said plunger are guided by said guide section and said cap, respectively.

* * * * *